W. R. RAY.
STUFFING BOX TAKE-UP.
APPLICATION FILED DEC. 14, 1917.

1,326,095.

Patented Dec. 23, 1919.

WITNESS
Charles Pickles
J. C. Benesch.

INVENTOR.
William R. Ray
BY Strong & Townsend
ATTORNEYS ered when it is desired to take up on the
UNITED STATES PATENT OFFICE.

WILLIAM R. RAY, OF SAN FRANCISCO, CALIFORNIA.

STUFFING-BOX TAKE-UP.

1,326,095.

Specification of Letters Patent.

Patented Dec. 23, 1919.

Application filed December 14, 1917. Serial No. 207,081.

*To all whom it may concern:*

Be it known that I, WILLIAM R. RAY, a citizen of the United States, residing in the city and county of San Francisco and State of California, have invented new and useful Improvements in Stuffing-Box Take-Ups, of which the following is a specification.

This invention relates to a taking up device for stuffing boxes.

In the installation of pumps and like machinery, it often happens that the stuffing boxes employed assume such positions that it is practically impossible and almost always inconvenient to reach the screws or nuts by which the glands are tightened. This naturally results in general neglect, hence permitting rapid wear and leaking boxes.

One of the objects of the present invention is to provide an attachment which may be applied to any stuffing box and which will permit it to be readily tightened or even removed, if necessary, to repack the box. Further objects will hereinafter appear.

The invention consists of the parts and the construction and combination of parts as hereinafter more fully described and claimed, having reference to the accompanying drawings, in which—

Figure 1:
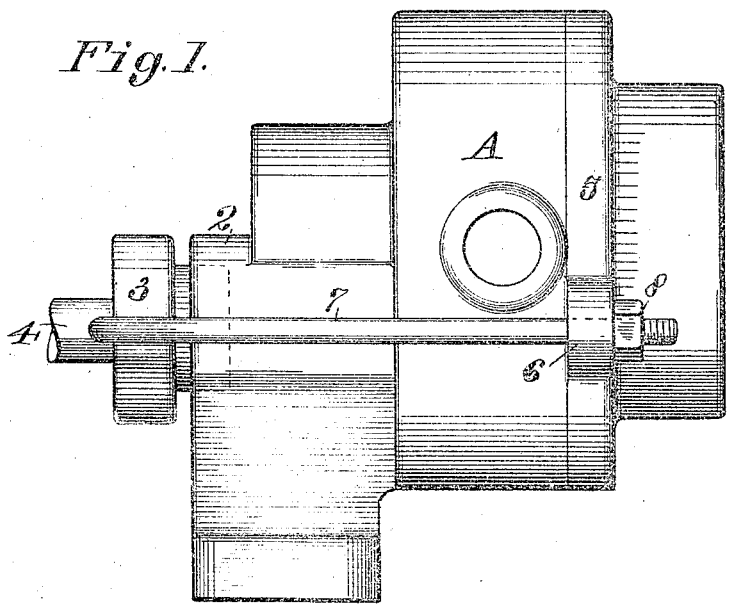
Figure 1 is a side elevation of a pump, showing the application of the invention.
Figure 2:
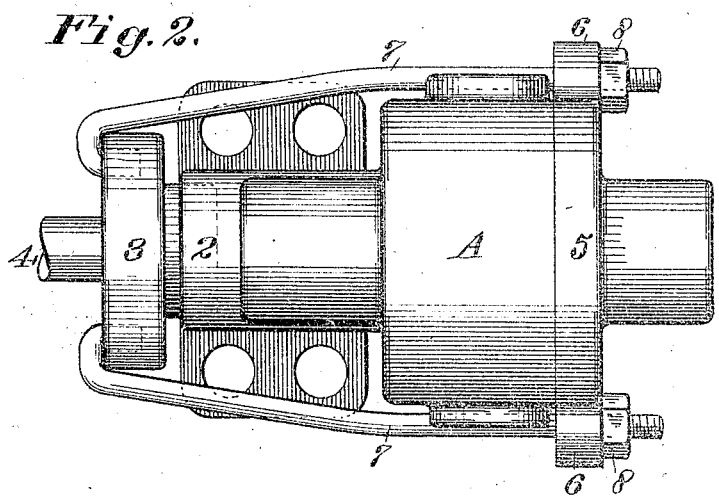
Fig. 2 is a plan view of the same.

Referring to the drawings in detail, A indicates a casing of a standard form of gear pump, 2 a stuffing box, 3 a packing gland, 4 a driving shaft extending therethrough, and 5 a pump head which forms a closure for the pump chamber in which the gears are mounted.

Formed on the head on each side thereof is a lug 6, and extending through each lug is a rod 7, one end of which is inclined and hook-shaped to engage the perforated flange of the packing gland, while the opposite end is threaded to receive a nut 8. The rods having the hook-shaped ends here shown are employed in preference to the screws and bolts heretofore used as they may be made sufficiently long or projected to a point where they may always be conveniently reached when it is desired to take up on the packing gland or remove it when it is necessary to repack the box. The length of the rods also permits a more or less yielding movement, as far as the gland proper is concerned, thereby preventing this from binding on the shaft and causing unnecessary wear.

While the take-up or hook-shaped tightening rods are here shown as applied to a gear pump, it is obvious that they may be employed in connection with any other standard form of pump or machine requiring a stuffing box.

The materials and finish of the several parts of the device may be such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. In combination with a pump casing having a head on one end, a driving shaft and a stuffing box with a perforated packing gland mounted on said shaft, the gland being disposed at the opposite end of the casing, perforated lugs on the head, a pair of rods having outer ends overlying the casing and extending through the lug perforations and having nuts thereon, the inner end portions of the rods being inclined and extending toward each other and over the shaft in spaced relation thereto and having hook terminals engaged in the gland perforations, said rods being yieldable so as to allow movement of the gland relative to the shaft to prevent binding of the gland on the shaft.

2. In combination with a pump casing having a head on one end, a driving shaft and a stuffing box with a perforated packing gland mounted on said shaft, the gland being disposed at the opposite end of the casing, perforated lugs on the head, a pair of rods having outer ends overlying the casing and extending through the lug perforations and having nuts thereon, the inner end portions of the rods having hook terminals engaged in the gland perforations, said rods being yieldable so as to allow movement of the gland relative to the shaft to prevent binding of the gland on the shaft.

In testimony whereof I have hereunto set my hand in the presence of two subscribing witnesses.

WILLIAM R. RAY.

Witnesses:
 W. W. HEALEY,
 M. E. EWING.